United States Patent [19]
Doerner et al.

[11] Patent Number: 5,523,173
[45] Date of Patent: Jun. 4, 1996

[54] MAGNETIC RECORDING MEDIUM WITH A COPTCRB ALLOY THIN FILM WITH A 1120 CRYSTALLOGRAPHIC ORIENTATION DEPOSITED ON AN UNDERLAYER WITH 100 ORIENTATION

[75] Inventors: Mary F. Doerner, Santa Cruz; Brent D. Hermsmeier; Tadashi Yogi, both of San Jose, all of Calif.

[73] Assignee: International Business Machines Corporation, Armonk, N.Y.

[21] Appl. No.: 364,571

[22] Filed: Dec. 27, 1994

[51] Int. Cl.⁶ .................................................. G11B 5/66
[52] U.S. Cl. .................... 428/611; 428/65.7; 428/457; 428/667; 428/694 T; 428/694 TS; 428/900; 428/928; 204/192.2; 427/128; 427/131
[58] Field of Search .................. 428/65.7, 457, 428/611, 667, 694 T, 694 TS, 900, 928; 204/192.2; 427/128, 131

[56] References Cited

U.S. PATENT DOCUMENTS

| 4,789,598 | 12/1988 | Howard et al. | 428/408 |
| 5,236,791 | 8/1993 | Yahisa et al. | 428/694 |
| 5,266,418 | 11/1993 | Hayashi et al. | 428/694 |
| 5,282,946 | 2/1994 | Kinoshita et al. | 204/298.13 |

FOREIGN PATENT DOCUMENTS

| 4-221418 | 8/1992 | Japan | G11B 5/66 |
| 5-54359 | 3/1993 | Japan | G11B 5/66 |
| 5-182171 | 7/1993 | Japan | G11B 5/66 |
| 5-189738 | 7/1993 | Japan | G11B 5/66 |
| 5-205239 | 8/1993 | Japan | G11B 5/66 |

OTHER PUBLICATIONS

N. Tani et al., "High Coercivity Hard Disk with CoCrPtB/Cr Media", IEEE Trans. Magn. vol. 27, No. 6, Nov. 1991, pp. 4736–4738.
C. R. Paik et al., "Magnetic Properties and Noise Characteristics of High Coercivity CoCrPtB/Cr Media", IEEE Trans. Magn. vol. 28, No. 5, Sep. 1992, pp. 3084–3086.
M. F. Doerner et al., "Magnetic Medium with Improved CoPtCr Alloy", IBM Technical Disclosure Bulletin, vol. 37, No. 4A, p. 243.

Primary Examiner—Stevan A. Resan
Attorney, Agent, or Firm—James C. Wilson

[57] ABSTRACT

A high-density longitudinal recording medium comprising a CoPtCrB alloy with a chromium content in excess of 17 atomic percent exhibits high coercivity, low noise, and high Curie temperatures. Films are prepared by sputter depositing a chromium or chromium alloy underlayer on a non-magnetic substrate. A strong [100] crystallographic orientation of the underlayer is required to achieve a low noise, high coercivity medium. This orientation is achieved by depositing the underlayer on a negatively biased substrate under high temperature, low pressure conditions. The oriented underlayer prevents the subsequently deposited CoPtCrB alloy from orienting itself in its preferred, c axis vertical orientation. The CoPtCrB alloy comprises 4 to 12 percent platinum, 18 to 23 percent chromium and 2 to 10 percent boron.

16 Claims, 7 Drawing Sheets

MAGNETIC RECORDING MEDIUM WITH A COPTCRB ALLOY THIN FILM WITH A 1120 CRYSTALLOGRAPHIC ORIENTATION DEPOSITED ON AN UNDERLAYER WITH 100 ORIENTATION

TECHNICAL FIELD

This invention relates generally to magnetic recording media and, more particularly, to a CoPtCrB alloy useful for longitudinal magnetic recording.

BACKGROUND

CoPtCr alloys are known to be useful for longitudinal magnetic recording. In such media, the hexagonal close packed (HCP) crystalline structure of the cobalt alloy is formed so that the c-axis, i.e., the [0001] axis, of the cobalt alloy film is in the plane of the film or has a large component in the plane of the film. Such an alloy is described in U.S. Pat. No. 4,789,598, which discloses that CoPtCr alloys with a chromium content greater than 17 atomic percent exhibit substantially reduced media noise at high recording densities. This improvement is reflected in the alloy's larger signal-to-noise ratio (SNR). In general, this improvement in SNR continues as the chromium concentration of the alloy is increased. Unfortunately, chromium concentrations greater than 22 atomic percent can also reduce the Curie temperature and coercivity ($H_c$) of the alloy. Because high coercivity is a vital characteristic of high density magnetic recording media, the decrease in coercivity of CoPtCr alloys with high chromium content is a major obstacle to improving upon the low-noise characteristics of such alloys. For the foregoing reasons, there is a need for a thin film magnetic recording medium that matches or exceeds the desirable SNRs of high-chromium CoPtCr alloys while maintaining high coercivity and thermal stability.

SUMMARY OF THE INVENTION

The present invention is directed to a magnetic recording medium that satisfies this need through the use of a high-chromium CoPtCrB alloy deposited on a highly oriented non-magnetic underlayer. The resultant CoPtCrB recording medium improves upon the superior noise characteristics of high-chromium CoPtCr alloys while also exhibiting higher coercivity. In addition, the substitution of boron for platinum allows a reduction in the amount of costly platinum required to produce the media.

A magnetic medium having features of the present invention comprises a [11$\bar{2}$0] oriented CoPtCrB alloy sputter deposited on a Cr or Cr alloy underlayer. The composition of the alloy is $CoPt_xCr_yB_z$, where $12 \geq x \geq 4$, $23 \geq y \geq 18$, and $10 \geq z \geq 2$, and preferably $10 \geq x \geq 6$, $22 \geq y \geq 20$, and $6 \geq z \geq 4$. The crystallographic orientation of the underlayer is critical, having a large effect on the in-plane coercivity and remanent squareness of the resultant medium. An underlayer strongly oriented in the [100] direction is required to achieve a high coercivity, low-noise CoPtCrB recording medium.

For a fuller understanding of the nature and advantages of the present invention, reference should be made to the following detailed description taken in conjunction with the accompanying drawings.

DETAILED DESCRIPTION

Figure 1:
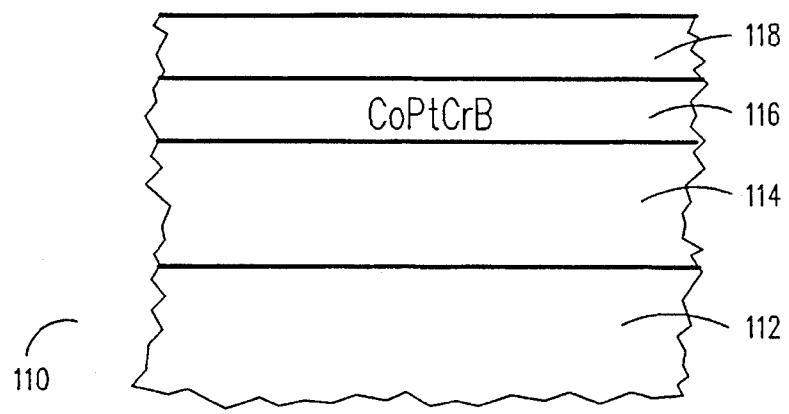
FIG. 1 is a cross-sectional view of a magnetic recording medium comprising a CoPtCrB magnetic layer.

With reference to FIG. 1, a cross-sectional view of a magnetic recording medium comprising a CoPtCrB magnetic film is illustrated. Unless otherwise noted, the general structure illustrated in FIG. 1 is representative of all following examples and embodiments. The magnetic recording medium 110 comprises a substrate 112, typically aluminum with a plated nickel-phosphorous coating, upon which a 300–1000 Å chromium or chromium-vanadium ($CRV_{20}$) underlayer 114 is deposited. Over the underlayer 114 is deposited the CoPtCrB magnetic layer 116, typically having a thickness in the range of 150–400 Å. Over the magnetic layer 116 is deposited a protective overcoat 118, typically sputtered carbon.

The metallic thin films referenced in the following examples and embodiments were sputter deposited in an argon atmosphere using a Varian 1100 magnetron sputtering apparatus. The CoPtCrB magnetic layers were deposited from COPtCrB targets having an alloy composition identical to that of the desired magnetic layer. In most examples, that composition is $Co_{64}Pt_8Cr_{22}B_6$. Unless otherwise noted, the underlayer and magnetic layer were deposited under the process conditions set forth below.

|  | Underlayer | Magnetic Layer |
| --- | --- | --- |
| Pressure | 5 mtorr | 5 mtorr |
| Flow | 11 sccm | 11 sccm |
| DC Power | 0.5–1.5 KW | 0.4–0.6 KW |
| Negative Bias | 200–400 V DC | None Applied |
| Thickness | 300–1100 Å | 200–300 Å |
| Substrate Temp. | 200–250° C. | 180–220° C. |

Figure 2:
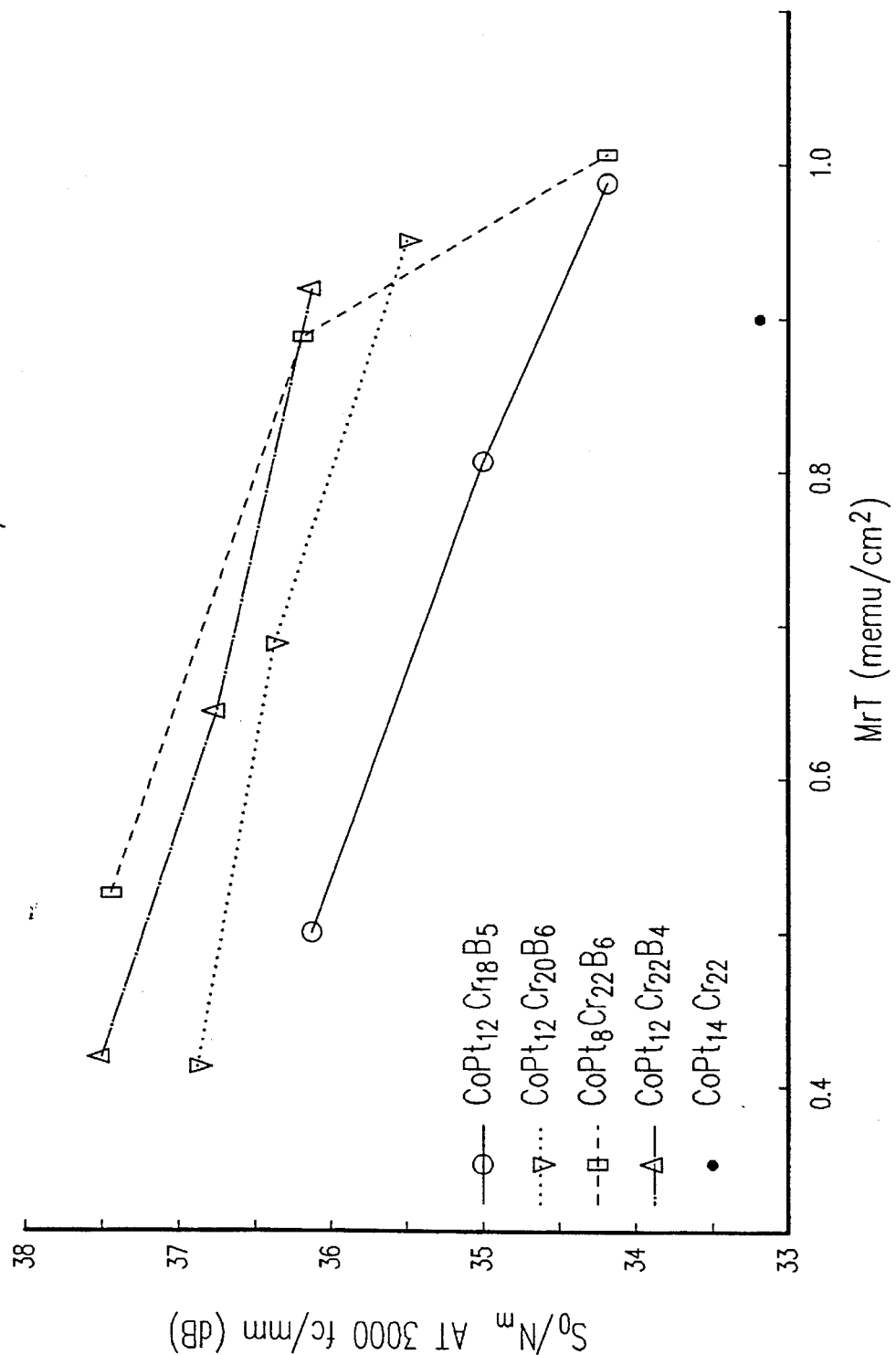
FIG. 2 is a graph illustrating the SNR of various CoPtCrB alloys as a function of $M_rt$.

Referring now to FIG. 2, there is illustrated noise data for several CoPtCrB alloys as a function of the remanent magnetization—thickness product ($M_rT$). The signal-to-noise ratio is calculated as the signal voltage of an isolated pulse divided by the RMS media noise of a signal written at 3000 flux reversals per millimeter. FIG. 2 illustrates the improvement in SNR as the chromium content of the alloy increases. For example, at an $M_rT$ of 0.5 memu/cm$^2$, the SNR of the $CoPt_{12}Cr_{18}B_5$ sample is 36.1 dB, while a sample containing 22 atomic percent chromium exhibits an SNR of 37.2 dB. This is the same trend seen in known CoPtCr alloys. However, the beneficial effect of high chromium on SNR is enhanced by the addition of boron to the alloy. This can be seen by comparing the 33.2 dB SNR of a $CoPt_{14}Cr_{22}$ alloy having an $M_rT$ of 0.9 memu/cm$^2$, to any of the other CoPtCrB alloys which have SNR values 1.8 to 2.9 dB higher.

As stated above, the proper crystallographic orientation of the underlayer 114 is critical to obtaining a CoPtCrB recording medium with desirable properties. When deposited without an optimized underlayer, CoPtCrB alloys with chromium concentrations greater than 18 atomic percent tend to orient their crystallographic c axis normal to the plane of the film. This orientation is not conducive to longitudinal recording. The present invention overcomes this limitation of the prior art by first depositing a Cr or Cr alloy underlayer strongly oriented in the [100] orientation. Subsequently, when a CoPtCrB alloy is sputter deposited on such an underlayer, it orients itself with enough in-plane orientation to be useful for longitudinal recording. This occurs due to the epitaxial growth of [11$\bar{2}$0] CoPtCrB on [100] chromium-based underlayers. The present invention achieves the required [100] underlayer orientation through the proper selection of sputter deposition conditions. Specifically, the temperature, substrate bias voltage, and pressure at which the underlayer is sputter deposited are carefully selected to obtain a superior recording medium. It is also required that the amount of residual gas in the vacuum system be minimized to allow proper orientation of the underlayer and good epitaxy between the underlayer and the magnetic layers. For example, in a Varian 1100 system, the base pressure of the main chamber and deposition chambers should be below $1.0 \times 10^{-7}$ torr prior to sputtering.

Figure 3:
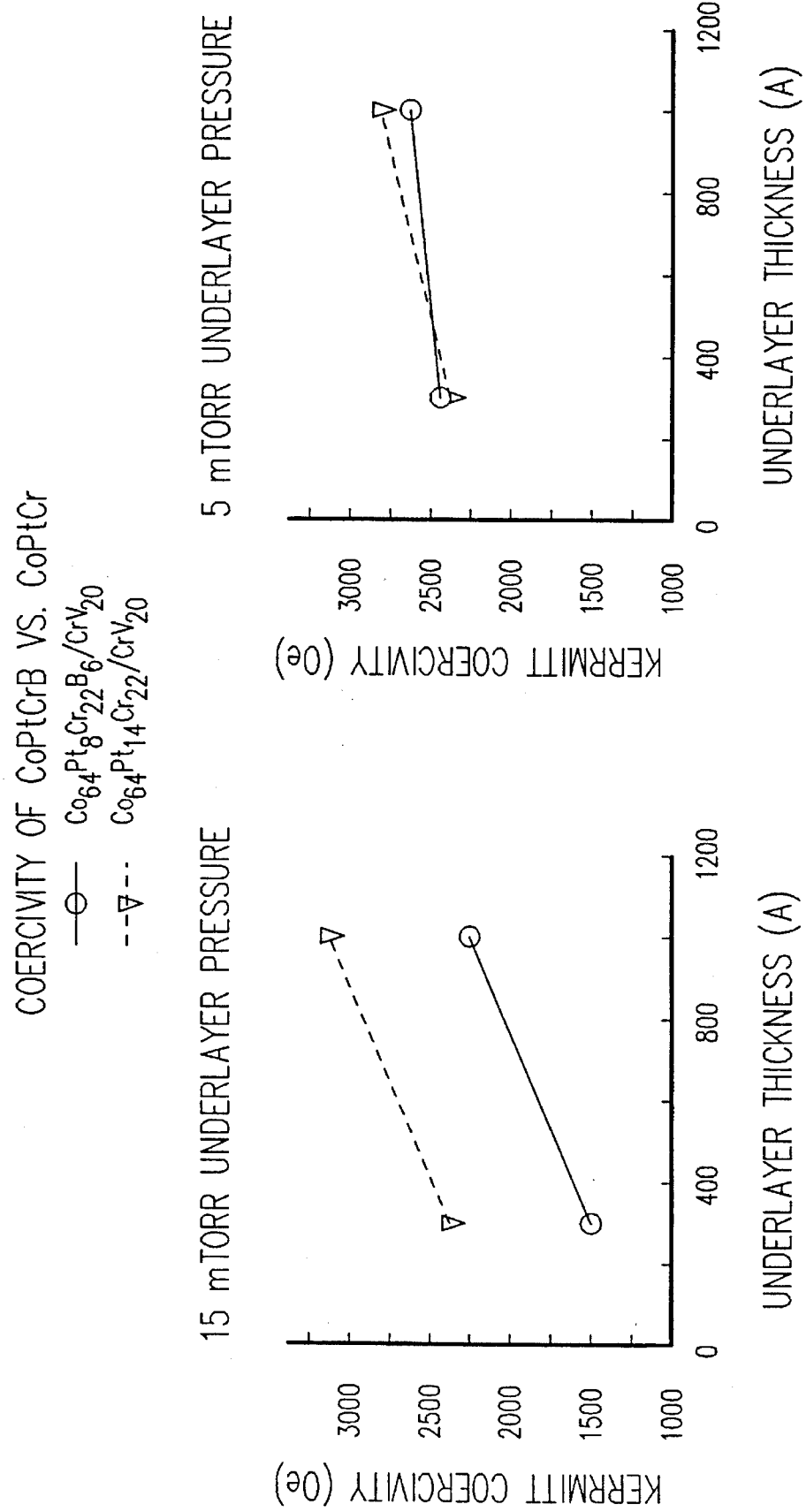
FIG. 3A is a graph illustrating the $H_c$ of a CoPtCrB and CoPtCr alloy deposited on underlayers of varying thickness which were sputter deposited at 15 mtorr.
FIG. 3B is a graph illustrating the $H_c$ of a CoPtCrB and CoPtCr alloy deposited on underlayers of varying thickness which were sputter deposited at 5 mtorr.

Referring now to FIGS. 3A and 3B, the relationship between coercivity and underlayer thickness is illustrated for a $Co_{64}Pt_{14}Cr_{22}$ and $Co_{64}Pt_8Cr_{22}B_6$ alloy, both with $CrV_{20}$ underlayers deposited at 15 mtorr and 5 mtorr respectively. While 5 mtorr underlayer deposition decreases the coercivity of the CoPtCr alloy, as compared to 15 mtorr deposition, the opposite effect is unexpectedly seen for the CoPtCrB alloy. At an underlayer thickness of 300 Å, the coercivity increases from approximately 1300 to 2300 Oersted. This large increase in in-plane coercivity is believed to be due to the effect of deposition pressure on the microstructure and crystallographic orientation of the underlayer, which strongly influences the orientation of the CoPtCrB magnetic layer.

Figure 4:
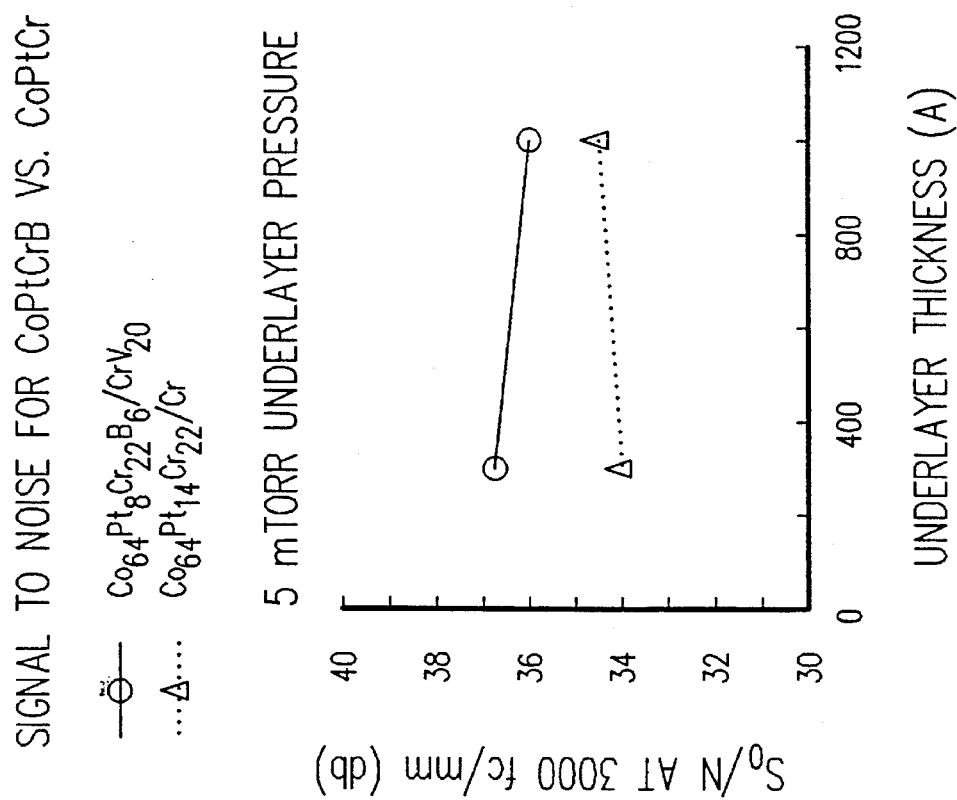
FIG. 4 is a graph of the relationship between SNR and underlayer thickness for CoPtCr and CoPtCrB samples with underlayers sputter deposited at 5 mtorr.

Referring now to FIG. 4, the relationship between media noise and underlayer thickness is illustrated for a $CO_{64}PT_8Cr_{22}B_6/CrV_{20}$ medium and a $Co_{64}Pt_{14}Cr_{22}/Cr$ medium, both deposited at an underlayer pressure of 5 mtorr. At an underlayer thickness of 300 Å, the CoPtCrB/CrV medium has a signal-to-noise ratio approximately 3 dB higher than that of the prior art CoPtCr/Cr medium.

In addition to deposition pressure, substrate bias is another process parameter that has a strong effect on the magnetic properties of the resultant CoPtCrB medium. For example, $CoPt_8Cr_{22}B_6$ samples sputtered at 5 mtorr have a signal-to-noise ratio of 36.1 dB at 3000 fc/mm. When a negative substrate bias of 300 volts is applied during the deposition of the underlayer, the SNR improves to 37.7 dB. Similarly, for a $CoPt_{12}Cr_{18}B_5$ alloy, the SNR improves from 35.4 to 36.9 dB when a bias voltage is applied during underlayer deposition.

Figure 5:
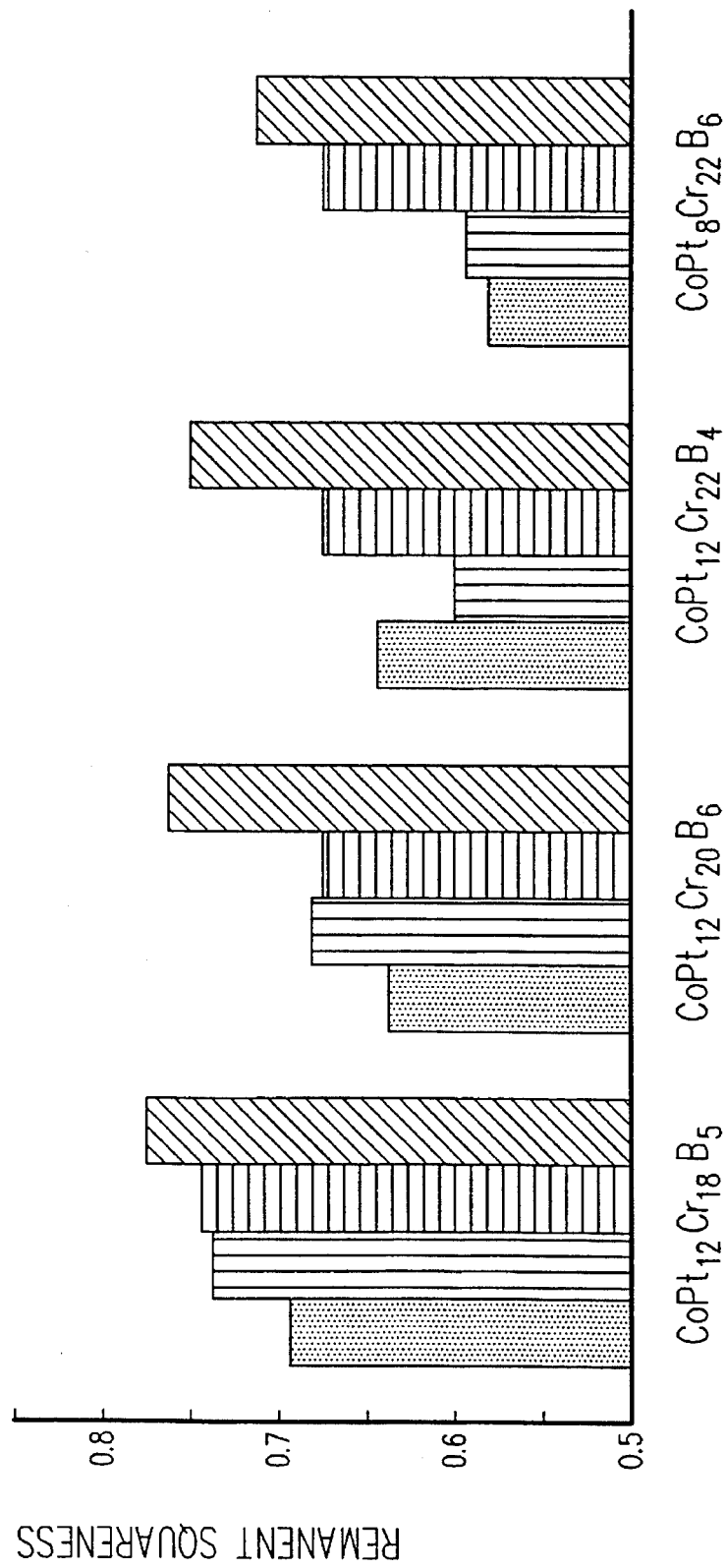
FIG. 5 is a graph illustrating the improvement in remanent squareness of CoPtCrB alloys as deposition pressure is decreased and substrate bias is applied during underlayer deposition.

Substrate biasing during underlayer deposition also improves the remanent squareness ($M_r/M_s$) of the CoPtCrB medium. Remanent squareness values above 0.7 are generally desired in order to achieve good overwrite and resolution performance. Referring now to FIG. 5, the remanent squareness measurements of several CoPtCrB alloys with underlayers deposited at various deposition pressures and substrate bias conditions are illustrated. It can be seen that the remanent squareness generally decreases with increasing chromium concentration. In order to take advantage of the low-noise properties of CoPtCrB alloys with high chromium concentrations, the underlayer deposition conditions must be carefully selected to overcome this tendency. The low pressure, high temperature and substrate bias conditions of the present invention result in the high squareness required for superior recording performance.

Figure 6:
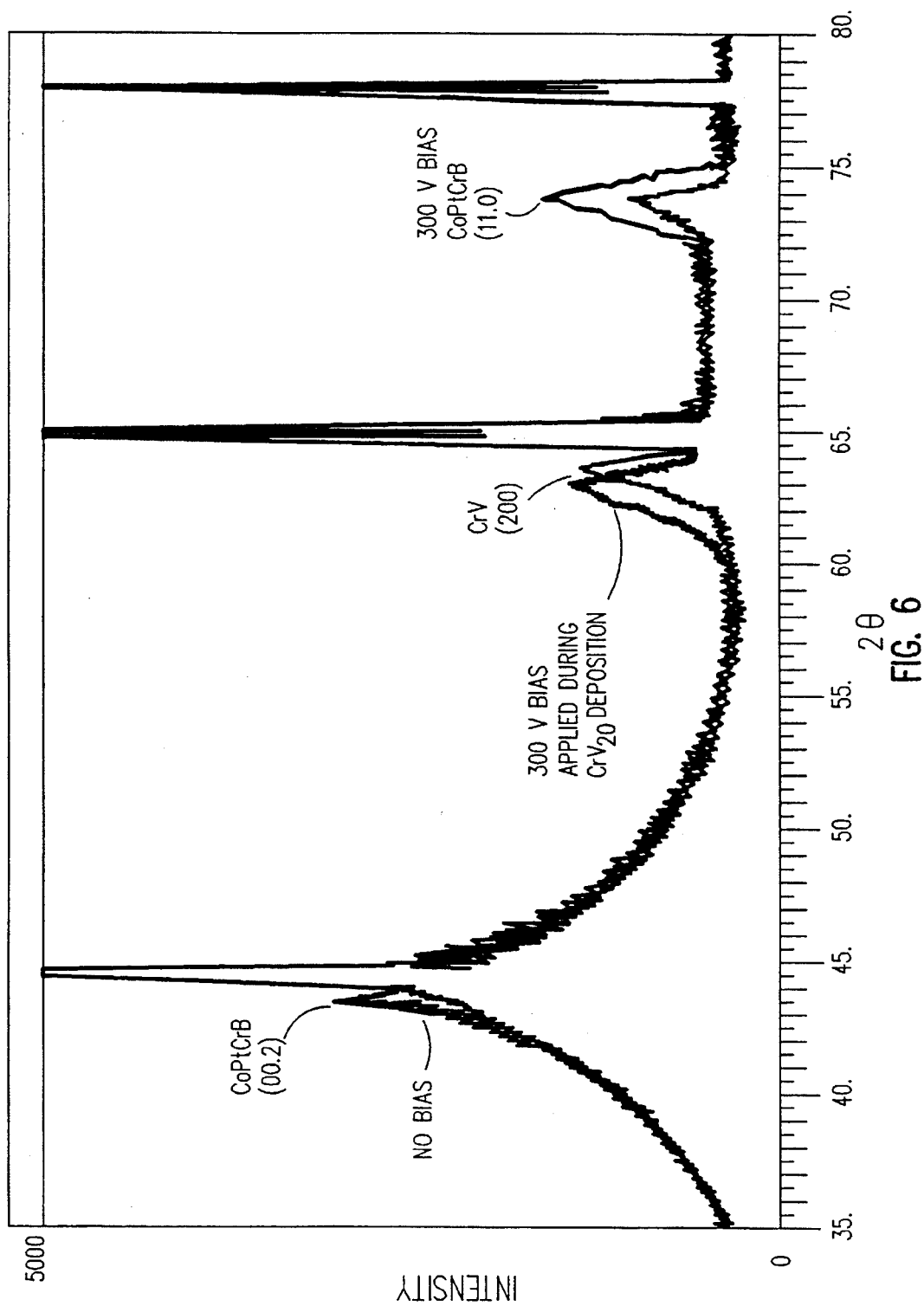
FIG. 6 is an x-ray spectrograph of CoPtCrB/CrV samples fabricated with and without a negative DC bias applied to the substrate during underlayer deposition.

Referring now to FIG. 6, x-ray spectrographs of two $Co_{64}Pt_8Cr_{22}B_6/CrV_{20}$ samples are illustrated. One sample was fabricated with a negative bias of 300 volts applied to the substrate during underlayer deposition, while the other sample had no bias applied. For the most part, the spectrographs of the two samples are similar. However, there are differences that illustrate the desirable crystallographic effects that result from applying a bias voltage during underlayer deposition. A large, broad rise in intensity, centered at $2\theta=45°$ degrees, is a result of the protective NiP layer. Superimposed on this peak is another peak, centered at $2\theta=43°$ and present only in the sample fabricated without bias, that results from CoPtCrB material in the undesirable [0001] orientation. At approximately $2\theta=63°$, the higher, broader peak results from the greater quantity of [100] oriented CrV in the sample that was biased during underlayer deposition. As discussed above, this preferred [100] underlayer orientation results in a much stronger orientation of the overlying CoPtCrB layer in the desired [11$\bar{2}$0] direction. This result is clearly seen by examining the two peaks centered at $2\theta=74°$. The higher, broader peak results from the sample that was biased during underlayer deposition. The larger peak is indicative of a greater quantity of CoPtCrB material oriented in the preferred [11$\bar{2}$0] orientation.

Figure 7:
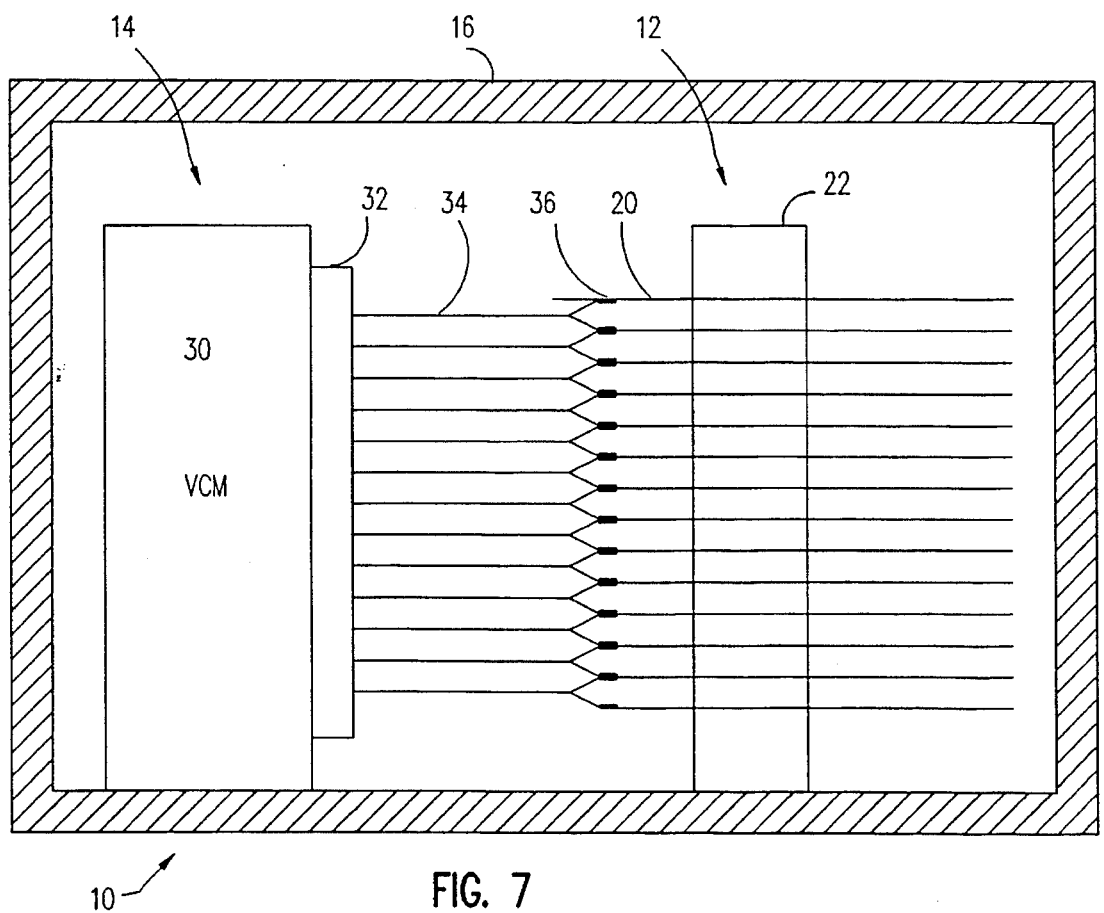
FIG. 7 is a schematic diagram of a disk drive system useful for practicing the present invention.

A preferred embodiment of the present invention utilizes a CoPtCrB thin film as the magnetic layer of disks in a magnetic recording disk drive. With reference to FIG. 7, a schematic diagram of a magnetic recording disk drive is illustrated and is designated by the general reference number 10. System 10 comprises a disk spindle assembly 12 and a head actuator assembly 14. Spindle assembly 12 and head actuator assembly 14 are located within a sealed housing 16 to prevent particulate contamination. Spindle assembly 12 comprises one or more magnetic recording disks 20 which are mounted to a spindle 22. Spindle 22 is rotated by an in-hub electrical motor which is not illustrated. Head actuator assembly 14 comprises a voice coil motor 30 which moves an actuator arm assembly 32 relative to the disks 20. Assembly 32 has a plurality of actuator arms 34, each of which is positioned in a space between two adjacent disks 20. Each actuator arm 34 has a pair of read/write heads 36. One head reads the disk positioned above the actuator arm 34 and the other reads the disk positioned below the actuator arm 34.

In operation, spindle 22 is rotated by the in-hub motor and motor 30 moves the actuator arms 34 between the disks 20 to the desired track location. One of the read/write transducers 36 then reads or writes data on the desired track.

Figure 8:
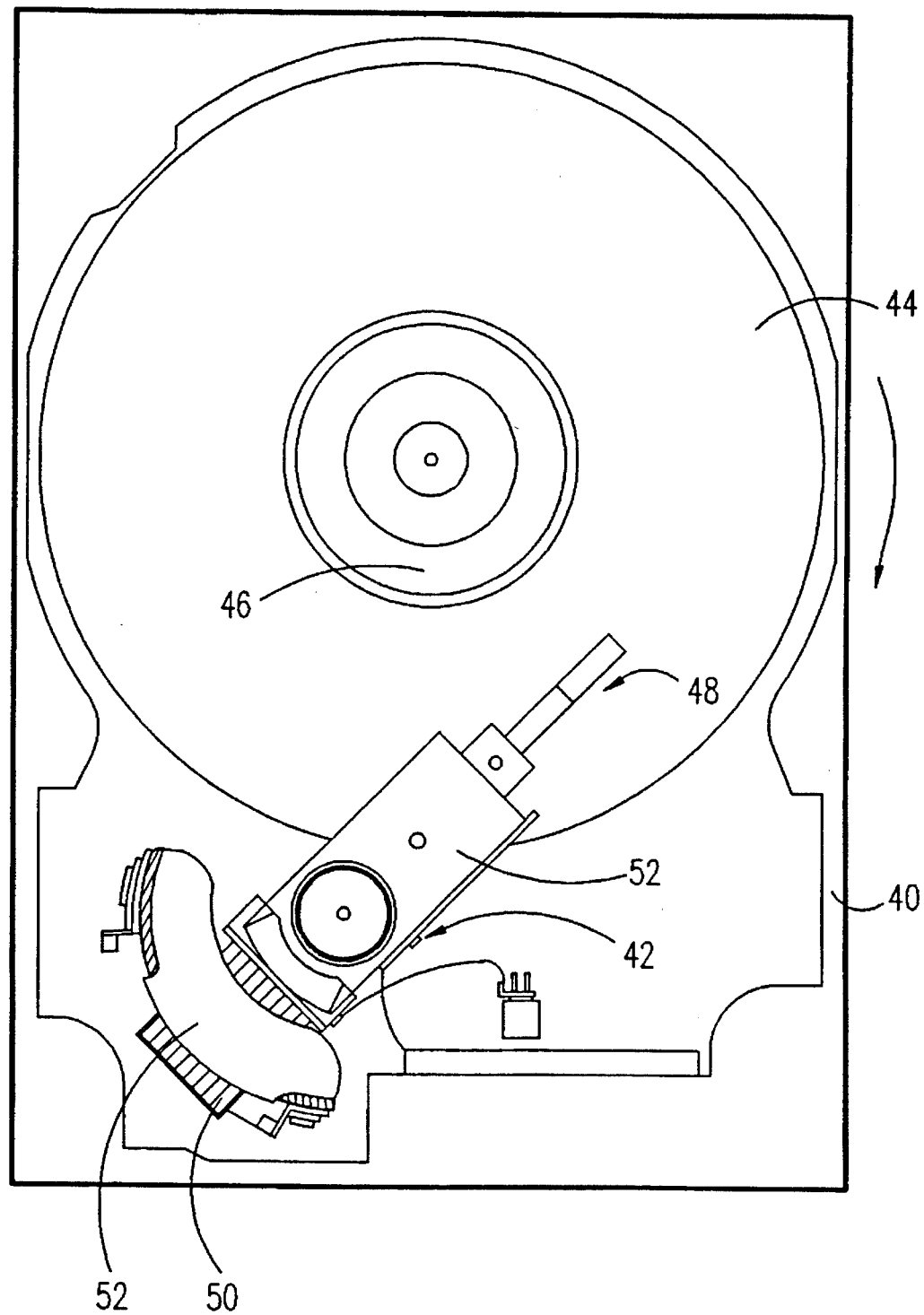
FIG. 8 is a top plan view of a disk drive system useful for practicing the present invention.

Referring now to FIG. 8, a data recording disk drive useful for practicing the present invention is illustrated. The disk file includes a housing 40 in which is mounted a rotary actuator 42, an associated disk 44 and a drive means 46 for rotating the disk 44. The rotary actuator 42 moves a suspension assembly 48 in an arcuate path over the disk 44. The rotary actuator 42 includes a voice coil motor, which comprises a coil 50 movable within the magnetic field of a fixed permanent magnet assembly 52. An actuator arm 54 is attached to the movable coil 50. The other end of the actuator arm 54 is attached to the transducer-suspension assembly 48.

In the preferred embodiment, the disk 44 comprises an aluminum substrate with a NiP protective coating on which is formed a 500 Å $CrV_{20}$ underlayer film made in accordance with the present invention. Over this film is sputter deposited, at 5 mtorr, a 300 Å $CoPt_8Cr_{22}B_6$ magnetic layer at a substrate temperature of 180°–220° C.

Although the present invention has been described in considerable detail with reference to certain preferred versions thereof, other versions are possible. For example, although the invention has been described in combination with specific substrate materials, one skilled in the art could apply the present invention to other substrates. In addition, although the described embodiments of the present invention were fabricated in a single disk deposition system, other types of sputtering systems, such as an in-line, pallet-type system, can be used to practice the invention. Similarly, one skilled in the art would realize that the teachings of the present invention with respect to the quaternary alloy CoPtCrB can be applied to alloys of CoPtCrB and a fifth element. It should be apparent that other modifications and adaptations of the described embodiments may occur to one skilled in the art without departing from the scope of the present invention as set forth in the following claims.

We claim:

1. A thin film magnetic recording medium comprising:

a non-magnetic substrate; and a non-magnetic underlayer comprising chromium sputter deposited over said substrate at a pressure of 3 to 8 mtorr while said substrate is maintained at a negative bias substantially in the range of 200 to 400 volts, said underlayer having a substantially [100] crystallographic orientation; and a thin film comprising cobalt, platinum, chromium, and boron formed on said underlayer, said thin film having a substantially [11$\bar{2}$0] crystallographic orientation and a composition of $CoPt_xCr_yB_z$, wherein $12 \geq x \geq 4$, $23 \geq y \geq 18$, and $10 \geq z \geq 2$.

2. The thin film magnetic recording medium of claim 1 wherein said underlayer comprises chromium-vanadium.

3. The thin film magnetic recording medium of claim 2 wherein $10 \geq x \geq 6$, $22 \geq y \geq 20$, and $6 \geq z \geq 4$.

4. The thin film recording medium of claim 2 wherein said substrate has a temperature of 200°–250° C. during deposition of said underlayer.

5. The thin film magnetic recording medium of claim 2 wherein said underlayer is deposited at a pressure of 4 to 6 mtorr.

6. A thin film magnetic recording medium comprising:

a non-magnetic substrate; and a non-magnetic underlayer comprising chromium formed over the substrate, said underlayer having a substantially [100] crystal orientation;

a thin film comprising cobalt, platinum, chromium, and boron formed on said underlayer, said thin film having a substantially [11$\bar{2}$0] crystal orientation and a composition of $CoPt_xCr_yB_z$, wherein $12 \geq x \geq 4$, $23 \geq y \geq 18$, $10 \geq z \geq 2$.

7. The thin film magnetic recording medium of claim 6 wherein said underlayer comprises chromium-vanadium.

8. The thin film magnetic recording medium of claim 6 wherein $10 \geq x \geq 6$, $22 \geq y \geq 20$, and $6 \geq z \geq 4$.

9. A magnetic recording disk drive comprising:

a recording disk comprising;

a non-magnetic substrate; and a non-magnetic underlayer comprising chromium sputter deposited over said substrate at a pressure of 3 to 8 mtorr while said substrate is maintained at a negative bias substantially in the range of 200 to 400 volts, said underlayer having a substantially [100] crystallographic orientation; and a thin film comprising cobalt, platinum, chromium, and boron formed on said underlayer, said thin film having a substantially [11$\bar{2}$0] crystallographic orientation and a composition of $CoPt_xCr_yB_z$, wherein $12 \geq x \geq 4$, $23 \geq y \geq 18$, and $10 \geq z \geq 2$; and means for moving a transducer relative to said recording disk for reading data from or writing data to said recording disk.

10. The magnetic recording disk drive of claim 9 wherein said underlayer comprises chromium-vanadium.

11. The magnetic recording disk drive of claim 9 wherein $10 \geq x \geq 6$, $22 \geq y \geq 20$, and $6 \geq z \geq 4$.

12. A method for producing a thin film magnetic recording medium on a substrate, comprising the steps of:

sputter depositing a non-magnetic underlayer comprising chromium over said substrate at a pressure of 3 to 8 mtorr while said substrate is maintained at a negative bias substantially in the range of 200 to 400 volts; and sputter depositing a thin film comprising cobalt, platinum, chromium, and boron on said underlayer from sputtering targets having a composition of $CoPt_xCr_yB_z$, wherein $12 \geq x \geq 4$, $23 \geq y \geq 18$, and $10 \geq z \geq 2$.

13. The method of claim 12 wherein said underlayer comprises chromium-vanadium.

14. The method of claim 12 wherein $10 \geq x \geq 6$, $22 \geq y \geq 20$, and $6 \geq z \geq 4$.

15. The method of claim 12 wherein said substrate has a temperature of 200°–250° C. during deposition of said underlayer.

16. The method of claim 12 wherein said underlayer is deposited at a pressure of 4 to 6 mtorr.

* * * * *